(12) United States Patent
Shitara et al.

(10) Patent No.: US 8,294,949 B2
(45) Date of Patent: Oct. 23, 2012

(54) COLOR REPRODUCTION SHARING METHOD AND COMPUTER-READABLE PROGRAM FOR CARRYING OUT SUCH COLOR REPRODUCTION SHARING METHOD

(75) Inventors: Nobuyuki Shitara, Kanagawa-Ken (JP); Masashi Kuranoshita, Kanagawa-Ken (JP)

(73) Assignee: Fujifilm Corporation, Tokyo (JP)

( * ) Notice: Subject to any disclaimer, the term of this patent is extended or adjusted under 35 U.S.C. 154(b) by 825 days.

(21) Appl. No.: 12/469,824

(22) Filed: May 21, 2009

(65) Prior Publication Data
US 2009/0296155 A1 Dec. 3, 2009

(30) Foreign Application Priority Data
May 28, 2008 (JP) ................................. 2008-138874

(51) Int. Cl.
*H04N 1/405* (2006.01)
*G03F 3/08* (2006.01)
(52) U.S. Cl. .......... 358/1.9; 358/518; 358/519; 358/523
(58) Field of Classification Search .................... 358/1.9, 358/3.06, 518, 519, 523, 524; 345/591, 593, 345/604; 382/162, 167
See application file for complete search history.

(56) References Cited

U.S. PATENT DOCUMENTS

| | | | |
|---|---|---|---|
| 6,404,511 B1 | 6/2002 | Lin et al. | |
| 6,943,917 B2 | 9/2005 | Tamagawa | |
| 6,967,747 B2 | 11/2005 | Housel | |
| 7,006,691 B2 | 2/2006 | Muramoto | |
| 7,015,929 B2 * | 3/2006 | Satomi et al. | 345/604 |
| 7,280,690 B2 * | 10/2007 | Nogiwa | 382/167 |
| 7,911,665 B1 * | 3/2011 | Borg | 358/518 |
| 2005/0052668 A1 * | 3/2005 | Hoshino | 358/1.9 |
| 2005/0219260 A1 * | 10/2005 | Satomi et al. | 345/604 |
| 2007/0279715 A1 | 12/2007 | Morikawa | |

FOREIGN PATENT DOCUMENTS

| | | |
|---|---|---|
| EP | 0 604 755 | 7/1994 |
| EP | 1 950 038 | 7/2008 |
| JP | 2002-142126 | 5/2002 |
| JP | 2002-335415 | 11/2002 |
| JP | 2007-324861 | 12/2007 |

OTHER PUBLICATIONS

European Patent Office issued an European Search Report dated Dec. 2, 2009, Application No. 09006038.5.
Official Action issued by the Japanese Patent Office on Feb. 28, 2012 in Japanese Patent Application No. 2008-138874, with English translation of pertinent portion, 3 pages.

* cited by examiner

*Primary Examiner* — Kimberly A Williams
(74) *Attorney, Agent, or Firm* — Young & Thompson

(57) ABSTRACT

For sharing, as a second profile for a second output device, a known first profile for converting input device-dependent image data into first output device-dependent image data by performing a pre-gradation converting process, a color converting process, and a post-gradation converting process on the input device-dependent image data, a differential between a one-dimensional gradation conversion curve of a first color image output device and an inverse conversion curve of a one-dimensional gradation conversion curve of a second color image output device is determined by a differential generator, and then the first profile and a differential table are used as the second profile for the second color image output device.

10 Claims, 7 Drawing Sheets

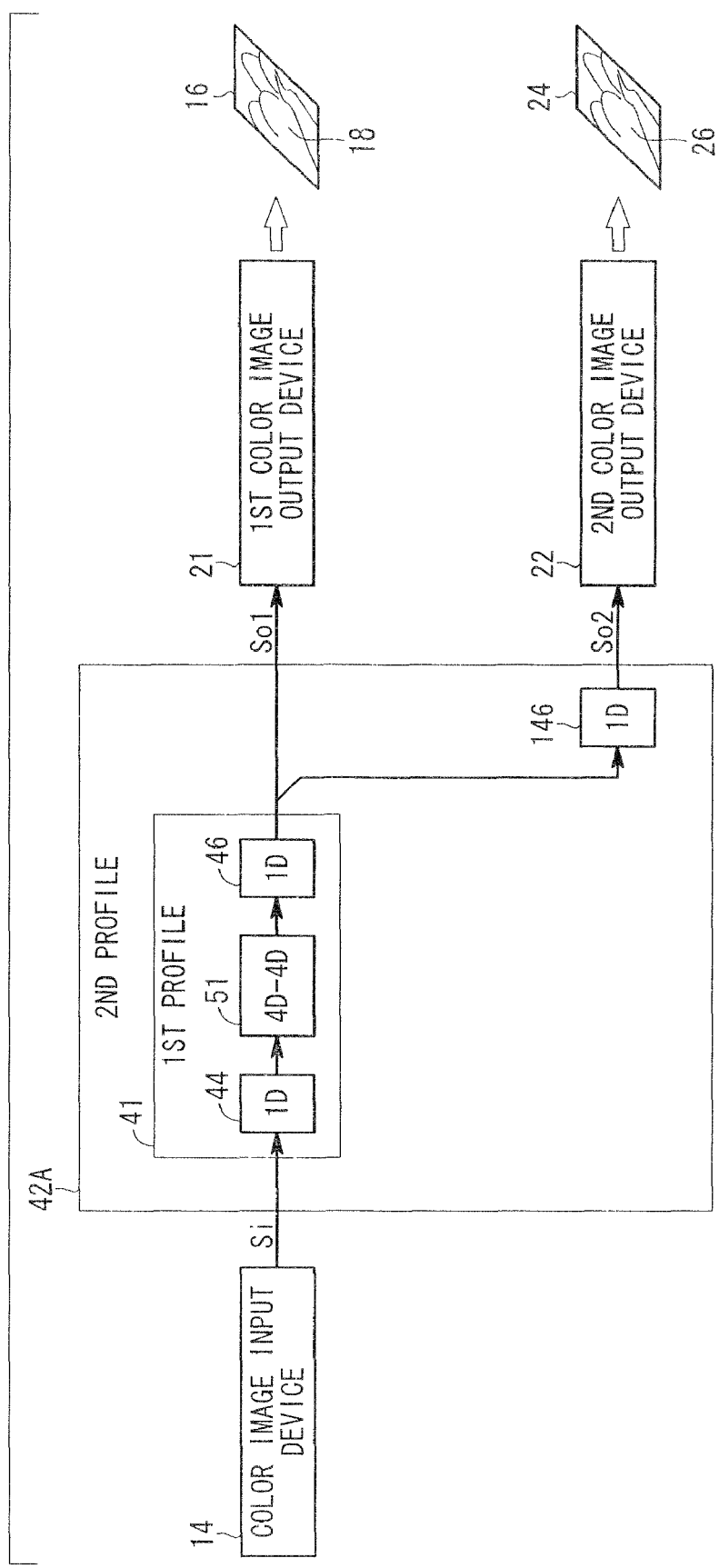

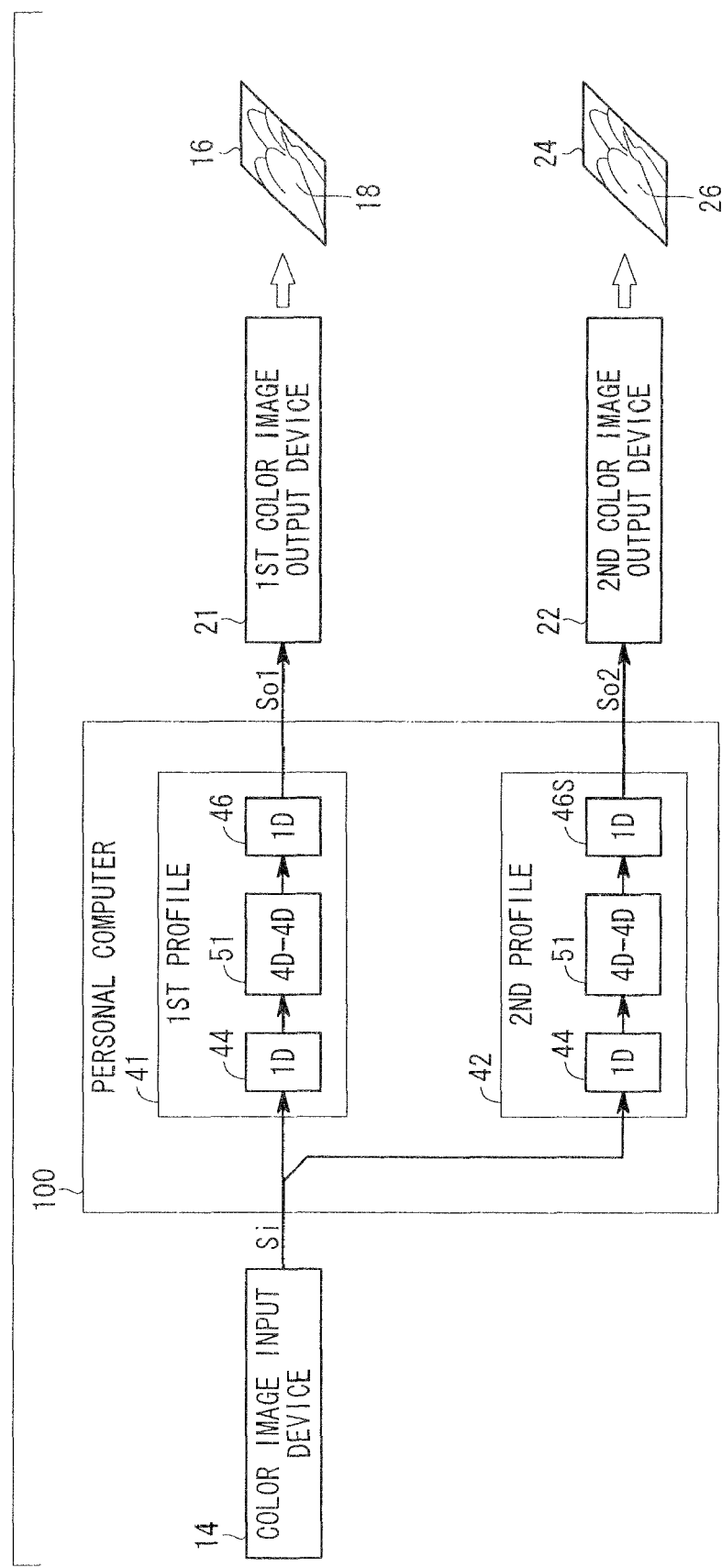

COLOR REPRODUCTION SHARING METHOD AND COMPUTER-READABLE PROGRAM FOR CARRYING OUT SUCH COLOR REPRODUCTION SHARING METHOD

BACKGROUND OF THE INVENTION

1. Field of the Invention

The present invention relates to a color reproduction sharing method for sharing a color reproduction by a plurality of color image output devices for a single color image input device, and a computer-readable program for carrying out such a color reproduction sharing method.

2. Description of the Related Art

It has been known in the art to convert RGB output data from a device-dependent color image input device, e.g., a digital camera, into device-independent calorimetric values with an input profile, thereafter convert the calorimetric values into CMYK input data with an output profile, and supply the CMYK input data to a device-dependent color image output device, e.g., a printer, for thereby sharing a color reproduction by the digital camera and the printer, i.e., matching the colors of the data handled by the digital camera and the printer (see Japanese Laid-Open Patent Publication No. 2002-335415).

Generally, a profile produced by combining the input profile and the output profile with each other is referred to as a DLP (Device Link Profile).

If the color reproduction of the digital camera is to be performed by another printer than the printer referred to above, then it is necessary to generate an output profile for the other printer, i.e., an output profile for converting device-independent colors into device-dependent colors.

The generation of such an output profile requires a number of color patches to be output and measured for their respective colors by a calorimeter. The measurement of the colors of the color patches with the colorimeter is highly tedious and time-consuming. In addition, it is difficult for general users to own the colorimeter because the colorimeter is highly expensive.

The output profile is a table for converting 3D (three-dimensional) calorimetric values such as XYZ data into 4D (four-dimensional) calorimetric values such as CMYK data. In order to generate the output profile, therefore, computations for volume interpolation are required, and a lot of time is needed to perform such computations.

SUMMARY OF THE INVENTION

It is an object of the present invention to provide a color reproduction sharing method for easily converting a profile for a color image output device into a profile for another color image output device, and a computer-readable program for carrying out such a color reproduction sharing method.

According to the present invention, there is provided a method of sharing the color reproduction by a plurality of color image output devices for input device-dependent image data, for sharing, as a second profile for a second output device, a known first profile for converting the input device-dependent image data into first output device-dependent image data depending on a first output device by performing a pre-gradation converting process, a color converting process, and a post-gradation converting process on the input device-dependent image data, the method comprising the steps of determining a differential between a gradation conversion curve of the first output device and an inverse conversion curve of a gradation conversion curve of the second output device, and using the first profile and the differential as the second profile for the second output device.

Since the differential between the gradation conversion curve of the first output device and the inverse conversion curve of the gradation conversion curve of the second output device is determined, and the first profile and the differential are used as the second profile for the second output device, the colors of an image represented by the input device-dependent image data can be managed and confirmed using the second output device.

With the above method, consequently, a profile for a color image output device (the first profile for the first output device) can easily be shared as or converted into a profile for another color image output device (the profile for the second output device).

As a result, the color reproduction by a plurality of color image output devices can easily be shared for the input device-dependent image data output from the single color image input device.

In the above method, the step of determining a differential comprises the steps of inputting gradation data of color data of the input device-dependent image data directly to the first output device and the second output device to produce patches on respective output mediums, measuring densities of the patches produced on the respective output mediums by the first output device and the second output device based on the gradation data, and determining the differential between the gradation conversion curve and the inverse conversion curve based on the measured densities.

Since the differential is 1D (one-dimensional), it can be calculated in a short period of time, and capacity of memory for storing the differential may be small.

In the above method, another post-gradation converting process which is a combination of the post-gradation converting process in the first profile and the differential is used instead of the post-gradation converting process. Computations for converting the input device-dependent image data into the output device-dependent image data are thus facilitated, and no memory area for storing the differential data is required.

If the color image output devices comprise respective printers for reproducing halftone dot images, then the second output device as a printer can output a color-managed image based on the input device-dependent image data.

According to the present invention, there is also provided a computer-readable program for carrying out the above method of sharing the color reproduction by a plurality of color image output devices for input device-dependent image data. The present invention also covers a recording medium storing such a computer-readable program.

With the present invention, consequently, a profile for a color image output device (the first profile for the first output device) can easily be shared as or converted into a profile for another color image output device (the profile for the second output device).

As a result, the color reproduction by a plurality of color image output devices can easily be shared for the input device-dependent image data output from the single color image input device.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a block diagram showing a configuration of a second profile; and

FIG. 7 is a block diagram showing a simplified configuration of the second profile.

DESCRIPTION OF THE PREFERRED EMBODIMENTS

An image forming system including a color reproduction sharing apparatus for carrying out a color reproduction sharing method according to an embodiment of the present invention will be described below with reference to the drawings.

Figure 1:
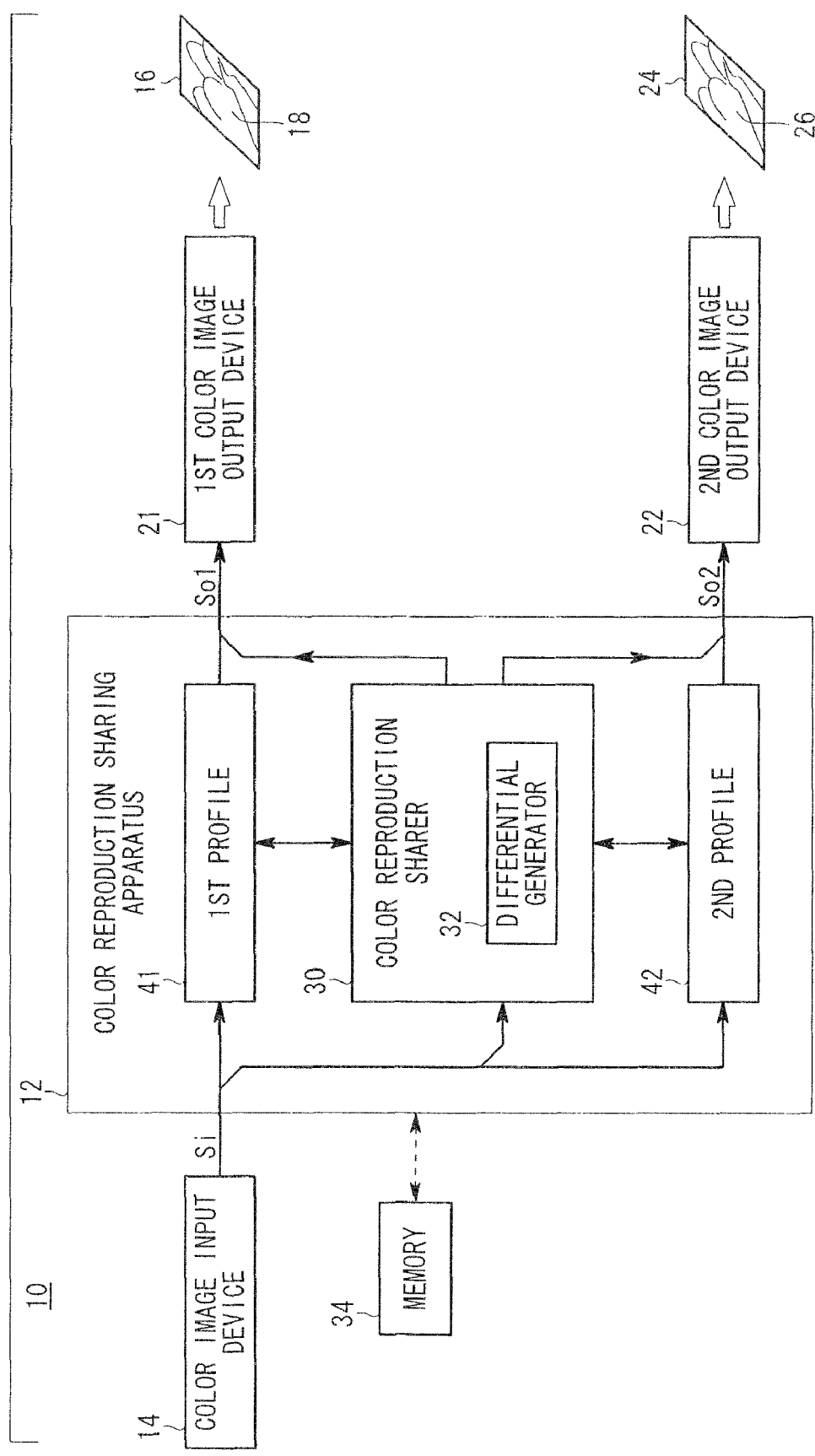
FIG. 1 is a block diagram of an image forming system including a color reproduction sharing apparatus for carrying out a color reproduction sharing method according to an embodiment of the present invention.

FIG. 1 is a block diagram of an image forming system 10 according to an embodiment of the present invention. As shown in FIG. 1, the image forming system 10 basically comprises a color reproduction sharing apparatus 12 for carrying out a color reproduction sharing method according to the present invention, a color image input device 14 for outputting input device-dependent image data Si to the color reproduction sharing apparatus 12, a first color image output device 21 (first output device) for being supplied with first output device-dependent image data So1 generated by the color reproduction sharing apparatus 12 and forming a color image 18 such as a color halftone dot image or the like on an output medium 16 such as a sheet of paper or the like, and a second color image output device 22 (second output device) for being supplied with second output device-dependent image data So2 generated by the color reproduction sharing apparatus 12 and forming a color image 26 such as a color halftone dot image or the like on an output medium 24 such as a sheet of paper or the like.

Figure 2:
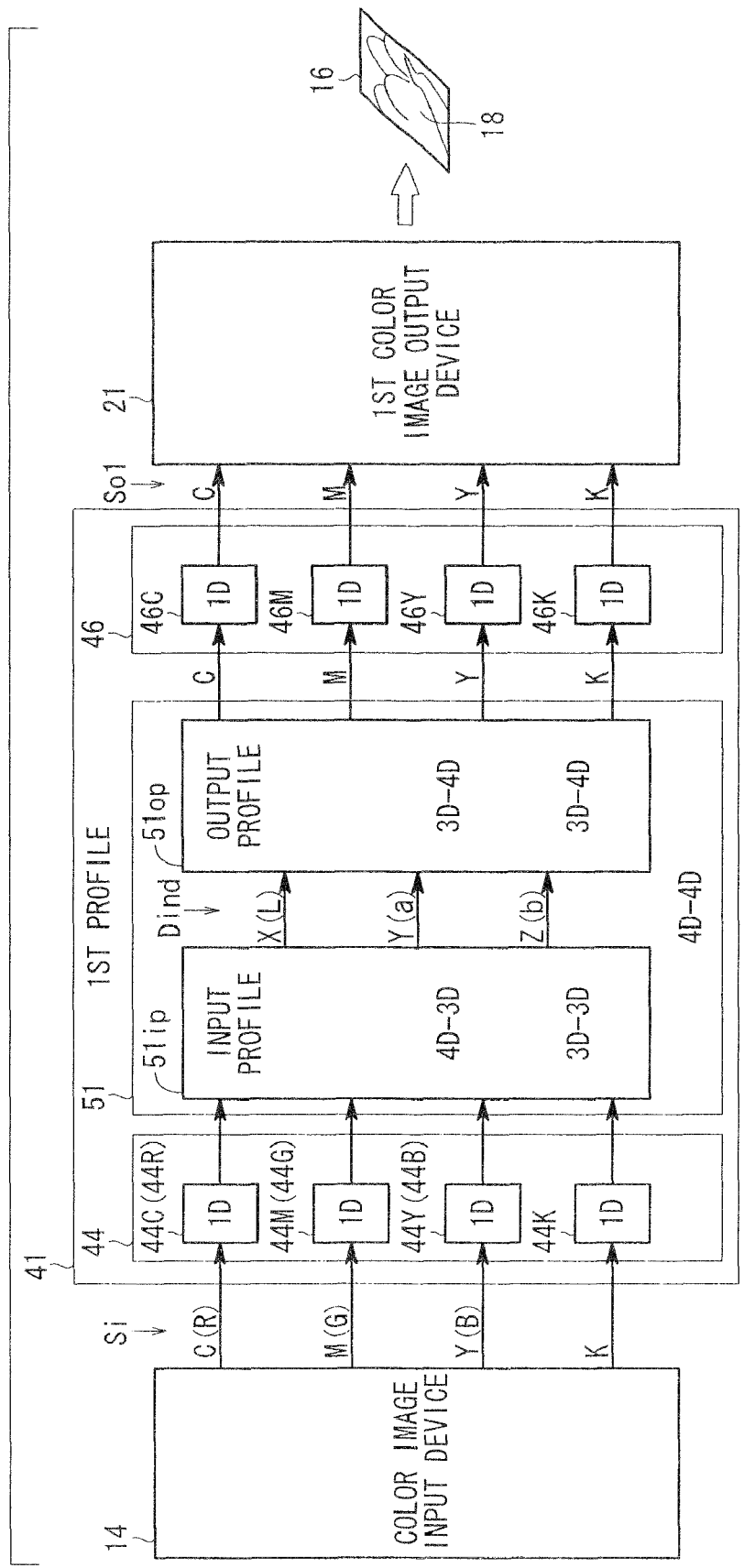
FIG. 2 is a block diagram showing a detailed configuration of a first profile.

As shown in FIG. 2, the color image input device 14 is typified by a color scanner which outputs CMYK image data as the input device-dependent image data Si or a digital camera which outputs RGB image data as the input device-dependent image data Si.

Each of the first and second color image output devices 21, 22 (also see FIG. 1) is typified by a color printer or a DDCP (Direct Digital Color Proofing) device.

The color reproduction sharing apparatus 12 is implemented by a personal computer or the like. The color reproduction sharing apparatus 12 operates as a function performing means for performing various functions when a CPU executes programs stored in a memory such as a ROM or the like based on various input data.

As shown in FIG. 1, the color reproduction sharing apparatus 12 functions as a color reproduction sharer 30 which includes a differential generator 32 as a function. The color reproduction sharer 30 may be stored as a computer-readable program in an external memory (recording medium) 34.

The color reproduction sharing apparatus 12 has a first profile 41 of known nature and a second profile 42 generated by the color reproduction sharer 30. The first profile 41 and the second profile 42 are stored in a memory of the personal computer or the like.

The first profile 41 (also see FIG. 2) is a color reproducing profile for converting the colors of the input device-dependent image data Si to generate the first output device-dependent image data So1, and supplying the first output device-dependent image data So1 to the first color image output device 21.

The second profile 42 is a color reproducing profile for converting the colors of the input device-dependent image data Si to generate the second output device-dependent image data So2, and supplying the second output device-dependent image data So2 to the second color image output device 22.

FIG. 2 shows a detailed configuration of the first profile 41.

As shown in FIG. 2, the first profile 41 basically comprises a first core profile 51 which is a combination of an input profile 51$ip$ and an output profile 51$op$, a pre-gradation converter 44, and a post-gradation converter 46.

The pre-gradation converter 44 represents a look-up table comprising one-dimensional converters 44C (44R), 44M (44G), 44Y (44B), 44K for converting the gradations of the colors C, M, Y, K of CMYK image data supplied from the color image input device 14 or the gradations of the colors R, G, B of RGB image data supplied from the color image input device 14 by way of one-dimensional conversion.

The post-gradation converter 46 represents a look-up table comprising one-dimensional converters 46C, 46M, 46Y, 46K for converting the gradations of the colors C, M, Y, K of CMYK image data supplied from the output profile 51$op$ by way of one-dimensional conversion.

The input profile 51$ip$ is a four-dimensional (4D)-to-three-dimensional (3D) converter for converting the colors of the input device-dependent image data Si into the colors of device-independent data Dind. The device-independent data Dind are three-dimensional data representing XYZ colorimetric values or Lab calorimetric values.

The output profile 51$op$ is a three-dimensional (3D)-to-four-dimensional (4D) converter for converting the colors of the device-independent data Dind into the colors of output device-dependent image data So1 prior to gradation conversion.

Figure 3:
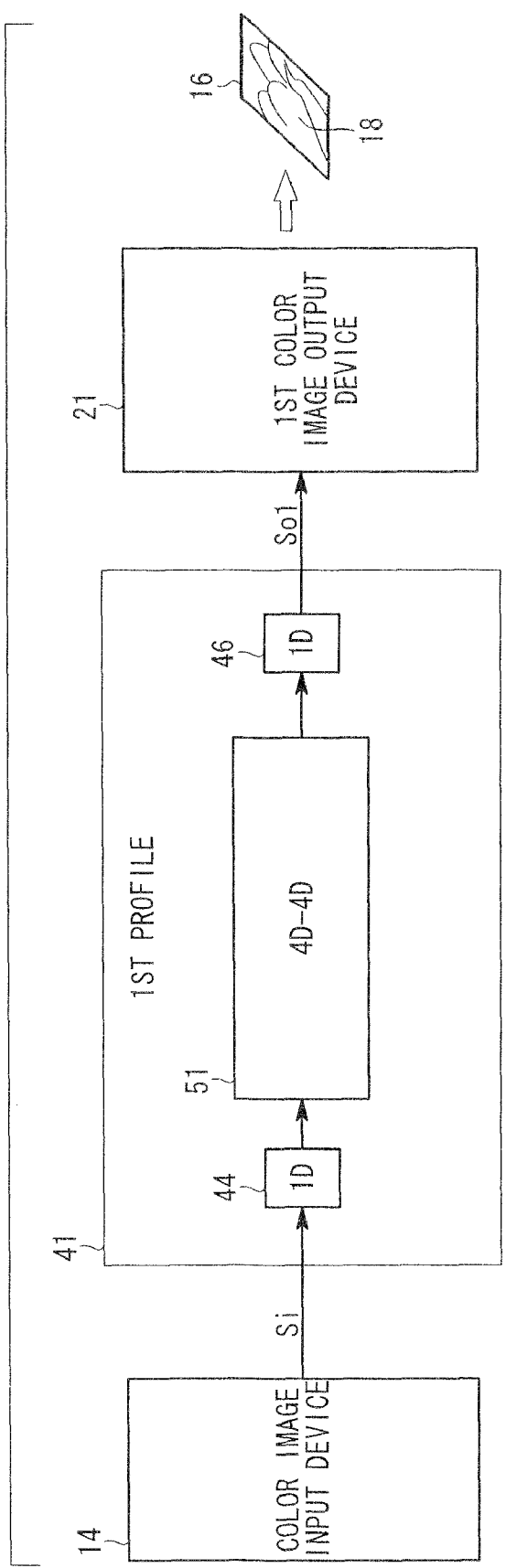
FIG. 3 is a block diagram showing a simplified representation of the first profile.

For the sake of brevity, the first profile 41 will also be described as the single combined DLP shown in FIG. 3.

As described with reference to FIG. 2, the first profile 41 shown in FIG. 3 comprises the pre-gradation converter 44, the first core profile 51, and the post-gradation converter 46. The first profile 41 converts the input device-dependent image data Si supplied from the color image input device 14 into the first output device-dependent image data So1 for the first color image output device 21.

A second profile generating process for simply generating the unknown second profile 42 for the second color image output device 22, using the known first profile 41 which has been generated for the first color image output device 21 will be described below with reference to a flowchart shown in FIG. 4.

Figure 4:
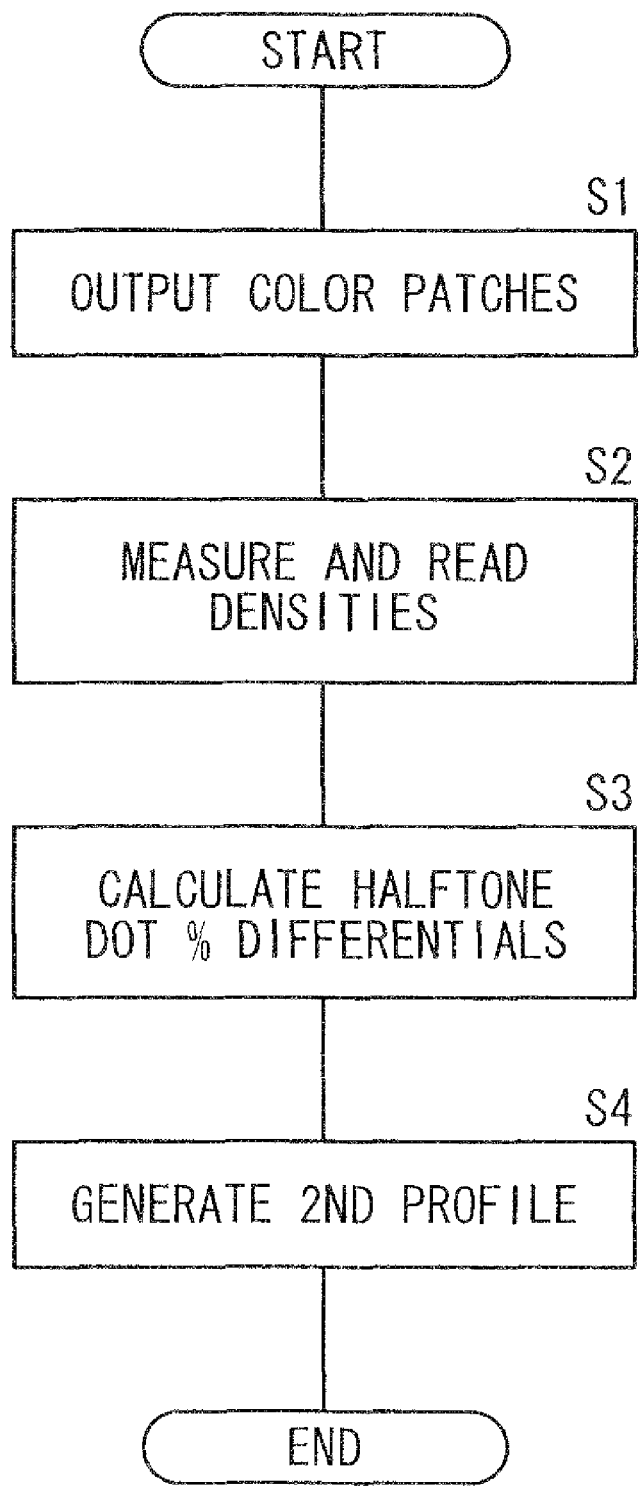
FIG. 4 is a flowchart of a second profile generating process.

In step Si shown in FIG. 4, the color reproduction sharer 30 supplies the gradation data of the color data CMYK of the input device-dependent image data Si output from the color image input device 14, directly to the first color image output device 21 and the second color image output device 22, not through the first profile 41. Based on the supplied gradation data, the first color image output device 21 and the second color image output device 22 generate color patches representing the gradation data of the color data CMYK as the color images 18, 26 on the output mediums 16, 24.

Alternatively, the color reproduction sharer 30 may generate the gradation data of the color data CMYK of the input device-dependent image data Si, supplies the generated gradation data directly to the first color image output device 21 and the second color image output device 22, riot through the first profile 41. Based on the supplied gradation data, the first color image output device 21 and the second color image output device 22 may generate color patches representing the gradation data of the color data CMYK as the color images 18, 26 on the output mediums 16, 24.

In step S2, the color reproduction sharer 30 controls a densitometer, not shown, to measure the densities of the color patches formed on the output mediums 16, 24, and reads the measured density data.

Figure 5:
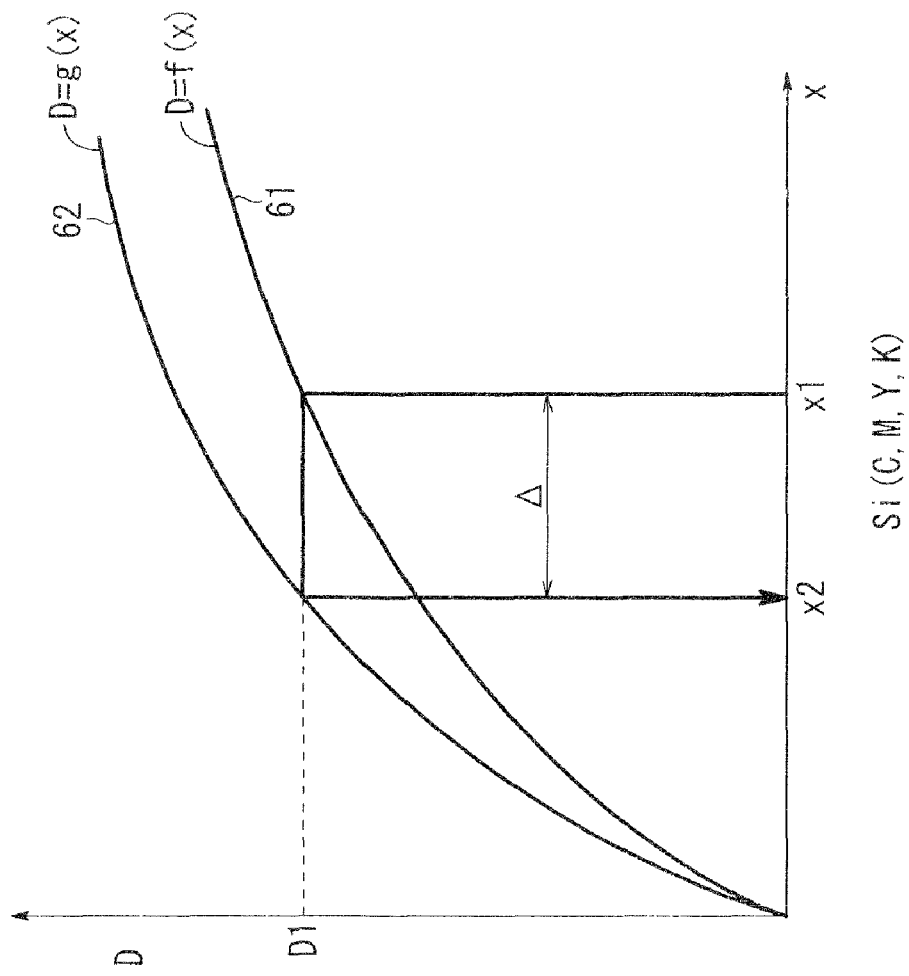
FIG. 5 is a diagram illustrative of the generation of a halftone dot % differential.

As shown in FIG. 5, the measured density data from the color patches on the output medium 16 represent a one-dimensional gradation conversion curve 61 of the first color image output device 21, and the measured density data from the color patches on the output medium 24 represent a one-dimensional gradation conversion curve 62 of the second color image output device 22. Basically, each of the colors of the color data CMYK has its own different gradation conversion curves 61, 62.

In FIG. 5, the horizontal axis represents halftone dot % in increments of 1%, for example, and the vertical axis the density D measured by the non-illustrated densitometer.

In step S3, the differential generator 32 of the color reproduction sharer 30 determines a differential (halftone dot % differential) Δ for each of the colors of the color data CMYK from the gradation conversion curve 61 and the gradation conversion curve 62. For an easier understanding of the invention, the gradation conversion curve 61 of the first color image output device 21 is approximated by a function D=f(x), and the gradation conversion curve 62 of the second color image output device 22 is approximated by a function D=g(x).

When an input halftone dot % of x1 is supplied to the first color image output device 21, the first color image output device 21 produces a density D=D1 {D1=f(x1)} in the color image 18 on the output medium 16. When the same input halftone dot % of x1 is supplied to the second color image output device 22, the second color image output device 22 is required to produce the density D=D1 in the color image 26 on the output medium 24.

In order for the second color image output device 22 to produce the density D=D1, it is necessary to convert the input halftone dot % of x1 into an input halftone dot % of x2.

Since D1=f(x1) and D1=g(x2), g(x2)=f(x1), and hence $x2=g^{-1}\{f(x1)\}$. Generally, an input halftone dot % of x on the second color image output device 22 is expressed by the following equation (1):

$$x=g^{-1}\{f(x)\} \quad (1)$$

In other words, the input halftone dot % of x on the second color image output device 22 can be determined by the inverse function (inverse conversion) of the function g(x) which is representative of the one-dimensional gradation conversion curve 62 of the second color image output device 22.

When the input halftone dot % of x1 is supplied to the second color image output device 22, the halftone dot % differential Δ for achieving the density D1 in the color image 26 on the output medium 24 with the second color image output device 22 can be determined by the following equation (2):

$$\Delta=x1-x2=x1-g^{-1}\{f(x1)\} \quad (2)$$

A table of one-dimensional halftone dot % differentials Δ between input halftone dot % of x1 and input halftone dot % of x2 is referred to as a differential table 146 (see FIG. 6). The differential table 146 is generated for each of the colors of the color data CMYK.

Then, in step S4, a profile 42A for the second color image output device 22 is generated. As shown in FIG. 6, the profile 42A for the second color image output device 22 is generated by connecting the differential table 146 for each of the colors of the color data CMYK to a stage following the first profile 41.

A program for carrying out steps S1 through S4 may be stored in the external memory 34 (recording medium) and can be read by other computers.

According to the present embodiments as described above, the known first profile 41 converts the input device-dependent image data Si into the first output device-dependent image data So1 by converting the gradations thereof with the pre-gradation converter 44, converting the colors thereof with the first core profile 51, and converting the gradations thereof with the post-gradation converter 46. For converting the known first profile 41 into the second profile 42A for the second color image output device 22, the differential table 146 is determined for each color, the table 146 comprising halftone dot % differentials Δ between the one-dimensional gradation conversion curve 61 of the first color image output device 21 and the inverse conversion curve of the one-dimensional gradation conversion curve 62 of the second color image output device 22. The first profile 41 and the differential table 146 are used as the second profile 42A for the second color image output device 22 (second output device).

Since the differential table 146 is determined for each color, the table 146 comprising halftone dot % differentials Δ between the one-dimensional gradation conversion curve 61 of the first color image output device 21 and the inverse conversion of the one-dimensional gradation conversion curve 62 of the second color image output device 22, and the first profile 41 and the differential table 146 are used as the second profile 42A for the second color image output device 22, the colors of the image represented by the input device-dependent image data Si supplied from the color image input device 14 can be managed and confirmed on the basis of the color image 26 which is produced on the output medium 24 by the second color image output device 22.

Consequently, a profile for a color image output device (the first profile 41 for the first color image output device 21) can easily be converted into a profile for another color image output device (the profile 42A for the second color image output device 22).

As a result, the color reproduction by a plurality of color image output devices (the second color image output device 22 in the above embodiment and also a third color image output device, a fourth color image output device, etc.) can easily be shared for the input device-dependent image data Si output from the single color image input device 14.

For determining halftone dot % differentials Δ, the gradation data of the CMYK color data of the input device-dependent image data Si are directly supplied to the first color image output device 21 and the second color image output device 22 which produce patches corresponding to the gradation data on the respective output mediums 16, 24 The densities of the patches on the output mediums 16, 24 are measured by the densitometer, and the halftone dot % differentials Δ are determined from the one-dimensional gradation conversion curves 61, 62 based on the measured densities.

Since the halftone dot % differentials Δ are 1D (one-dimensional), they can be calculated in a short period of time, and the memory for storing the halftone dot % differentials Δ (differential data) may be small.

The post-gradation converter 46 in the first profile 41 and the differential table 146 may be combined into a new post-gradation converter 46S (see FIG. 7). Thus, as shown in FIG. 7, the second profile 42 may comprise the pre-gradation converter 44, the first core profile 51, and the post-gradation converter 46S. In this case, as no memory for storing the differential table 146 is required, the second profile 42 shown in FIG. 7 is of a simplified configuration.

The first profile 41 and the second profile 42 may be installed in a personal computer 100 for use. If the color image input device 14, the first profile 41, and the first color image output device 21 are manufactured by Company A, and the second color image output device 22 is manufactured by Company B, then the color reproduction by the first color image output device 21 can easily be simulated by the second color image output device 22 when the second profile 42 is generated by sharing (converting) the first profile 41.

Although certain preferred embodiments of the present invention have been shown and described in detail, it should be understood that various changes and modifications may be made therein without departing from the scope of the appended claims.

What is claimed is:

1. A method of sharing a color reproduction by a plurality of color image output devices for input device-dependent image data, for sharing, as a second profile for a second output device, a known first profile for converting the input device-dependent image data into first output device-dependent image data depending on a first output device by performing a pre-gradation converting process, a color converting process, and a post-gradation converting process on the input device-dependent image data, the method comprising the steps of:
   determining a differential between a gradation conversion curve of the first output device and an inverse conversion curve of a gradation conversion curve of the second output device; and
   using the first profile and the differential as the second profile for the second output device.

2. A method according to claim 1, wherein the step of determining a differential comprises the steps of:
   inputting gradation data of color data of the input device-dependent image data directly to the first output device and the second output device to produce patches on respective output mediums;
   measuring densities of the patches produced on the respective output mediums by the first output device and the second output device based on the gradation data; and
   determining the differential between the gradation conversion curve and the inverse conversion curve based on the measured densities.

3. A method according to claim 1, wherein another post-gradation converting process which is a combination of the post-gradation converting process in the first profile and the differential is used instead of the post-gradation converting process.

4. A method according to claim 2, wherein another post-gradation converting process which is a combination of the post-gradation converting process in the first profile and the differential is used instead of the post-gradation converting process.

5. A method according to claim 1, wherein the color image output devices comprise respective printers for reproducing halftone dot images.

6. A non-transitory computer-readable medium storing a program for carrying out a method of sharing a color reproduction by a plurality of color image output devices for input device-dependent image data, for sharing, as a second profile for a second output device, a known first profile for converting the input device-dependent image data into first output device-dependent image data depending on a first output device by performing a pre-gradation converting process, a color converting process, and a post-gradation converting process on the input device-dependent image data, the program comprising the steps of:
   determining a differential between a gradation conversion curve of the first output device and an inverse conversion curve of a gradation conversion curve of the second output device; and
   using the first profile and the differential as the second profile for the second output device.

7. A non-transitory computer-readable medium storing a program according to claim 6, wherein the step of determining a differential comprises the steps of:
   inputting gradation data of color data of the input device-dependent image data directly to the first output device and the second output device to produce patches on respective output mediums;
   measuring densities of the patches produced on the respective output mediums by the first output device and the second output device based on the gradation data; and
   determining the differential between the gradation conversion curve and the inverse conversion curve based on the measured densities.

8. A non-transitory computer-readable medium storing a program according to claim 6, wherein another post-gradation converting process which is a combination of the post-gradation converting process in the first profile and the differential is used instead of the post-gradation converting process.

9. A non-transitory computer-readable medium storing a program according to claim 7, wherein another post-gradation converting process which is a combination of the post-gradation converting process in the first profile and the differential is used instead of the post-gradation converting process.

10. A non-transitory computer-readable medium storing a program according to claim 6, wherein the color image output devices comprise respective printers for reproducing halftone dot images.

* * * * *